US009305437B1

(12) United States Patent
Koopman et al.

(10) Patent No.: US 9,305,437 B1
(45) Date of Patent: Apr. 5, 2016

(54) HEURISTICS FOR MEDIA DISPENSING IN AUTOMATED TELLER MACHINES (ATMS)

(71) Applicant: PHOENIX INTERACTIVE DESIGN, INC., London (CA)

(72) Inventors: Mark Anthony Koopman, St. Thomas (CA); Christopher Carle Siegfried Walden, London (CA)

(73) Assignee: Phoenix Interactive Design, Inc., London (CA)

( * ) Notice: Subject to any disclaimer, the term of this patent is extended or adjusted under 35 U.S.C. 154(b) by 0 days.

(21) Appl. No.: 14/522,769

(22) Filed: Oct. 24, 2014

(51) Int. Cl.
*G06Q 40/00* (2012.01)
*G07D 11/00* (2006.01)
*G07F 19/00* (2006.01)

(52) U.S. Cl.
CPC ............ *G07F 19/203* (2013.01); *G07F 19/211* (2013.01)

(58) Field of Classification Search
CPC ........ G06Q 40/00; G07D 11/00; G07F 19/00; G06F 7/08; G06K 5/00; G06K 19/00
USPC .......................... 235/379, 375, 382, 381, 487
See application file for complete search history.

(56) References Cited

U.S. PATENT DOCUMENTS

| | | | | |
|---|---|---|---|---|
| 8,856,676 | B1 | 10/2014 | Starenky | |
| 2002/0011431 | A1* | 1/2002 | Graef et al. | 209/534 |
| 2003/0145205 | A1* | 7/2003 | Sarcanin | 713/172 |
| 2006/0169764 | A1* | 8/2006 | Ross et al. | 235/375 |
| 2009/0282366 | A1 | 11/2009 | DeBlaey | |
| 2011/0196789 | A1 | 8/2011 | Patton | |
| 2011/0270695 | A1 | 11/2011 | Jones | |
| 2014/0172703 | A1* | 6/2014 | Black | 705/43 |

OTHER PUBLICATIONS

WO International Search Report.

* cited by examiner

*Primary Examiner* — Edwyn Labaze
(74) *Attorney, Agent, or Firm* — Fleck & Chumak LLP; Yuri Chumak

(57) ABSTRACT

According to embodiments described in the specification, a method of dispensing media from an ATM is disclosed. The method includes the steps of: at an electronic device including a processor, a memory, and a touch-sensitive display, displaying a first mix of media items for dispensing by the ATM; receiving input from the touch-sensitive display including a first mix adjustment parameter; applying a heuristic based on the received first mix adjustment parameter, and, at the ATM, dispensing a second mix of media items, the second mix responsive to the application of the heuristic.

19 Claims, 7 Drawing Sheets

HEURISTICS FOR MEDIA DISPENSING IN AUTOMATED TELLER MACHINES (ATMS)

FIELD OF TECHNOLOGY

The present disclosure relates to automated teller machines (ATMs). Certain embodiments provide heuristics for media dispensing in ATMs.

BACKGROUND

Automated teller machines (ATMs) are in widespread use and provide several functions to allow self-service transactions to be made by holders of electronic accounts with financial institutions such as banks, credit unions, and the like. ATMs offer several conveniences including that ATMs may be accessed at any time, and may be installed in many locations including in or near the premises of financial institutions, as well as gas stations, shopping malls, airports, groceries, retailers, and the like.

A range of transactions may be performed at an ATM including currency (cash or banknote) withdrawals, currency or check deposits, account balance inquiries, account transfer, payment, or maintenance activities, and the like. A plastic card with a magnetic stripe or a chip that contains a unique card number may be inserted into a card slot of the ATM, and a personal identification number or other security token may be received, in order to identify and authenticate an account.

ATMs can dispense media (such as currency) from one or more cassettes contained within the ATM. Typically the mix of banknotes of currency is dispensed according to a predefined template. Where a unique or non-standard mix of media items is desired, more than one transaction, or indeed a teller-assisted transaction, may be required. There is a motivation for ATMs to handle more and different types of transactions in order to reduce the need for manual intervention, and to improve personalization, transparency, usefulness, and efficiency of ATMs in bank branches and elsewhere.

Improvements in ATMs and media dispensing methods and systems are desirable.

The foregoing examples of the related art and limitations related thereto are intended to be illustrative and not exclusive. Other limitations of the related art will become apparent to those of skill in the art upon a reading of the specification and a review of the drawings.

BRIEF DESCRIPTION OF THE DRAWINGS

Examples are illustrated with reference to the attached drawings. It is intended that the examples and figures disclosed herein be considered illustrative rather than restrictive.

Embodiments of the present disclosure will now be described, by way of example only, with reference to the attached figures, wherein.

DETAILED DESCRIPTION

Figure 1A:
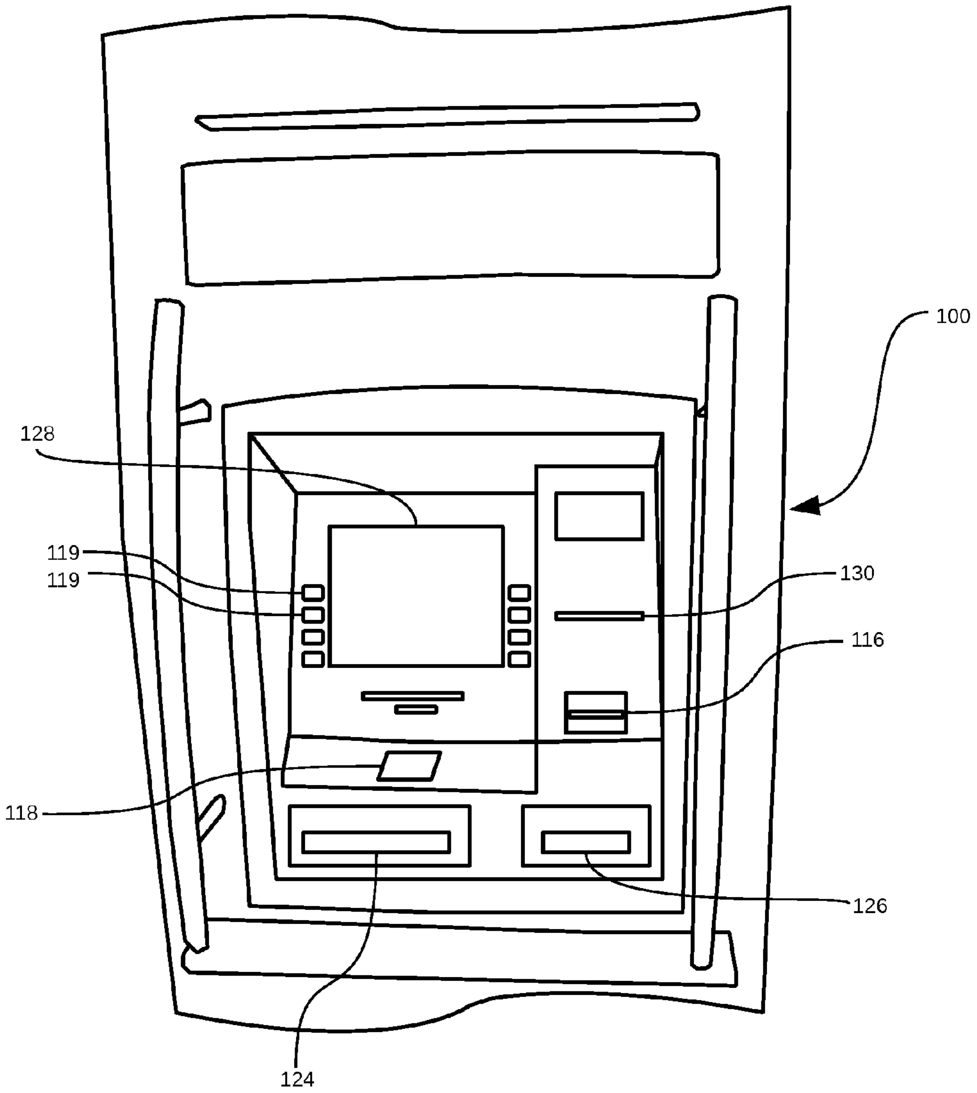
FIG. 1A is a front perspective view of an ATM in accordance with an example.

The following describes a method of dispensing media from an ATM. The method includes the steps of: at an electronic device including a processor, a memory, and a touch-sensitive display, displaying a first mix of media items for dispensing by the ATM; receiving input from the touch-sensitive display including a first mix adjustment parameter; applying a heuristic based on the received first mix adjustment parameter; and, at the ATM, dispensing a second mix of media items, the second mix responsive to the application of the heuristic.

Throughout the following description, specific details are set forth in order to provide a more thorough understanding to persons skilled in the art. However, well-known elements may not be shown or described in detail to avoid unnecessarily obscuring of the disclosure. Accordingly, the description and drawings are to be regarded in an illustrative, rather than a restrictive, sense.

To facilitate illustration, reference numerals may be repeated among the figures to indicate similar or corresponding elements. Various details are set forth to demonstrate the examples described herein. The examples may be practiced or implemented without these details. Methods, routines, components, and parts that are well known may not be described in detail to avoid obscuring the examples described. The description is not to be considered as confined to the scope of the examples described herein.

The disclosure relates generally to automated teller machines (ATMs) and to systems configured to be interoperable with ATMs, and to systems and methods for media dispensing as described herein.

Figure 1B:
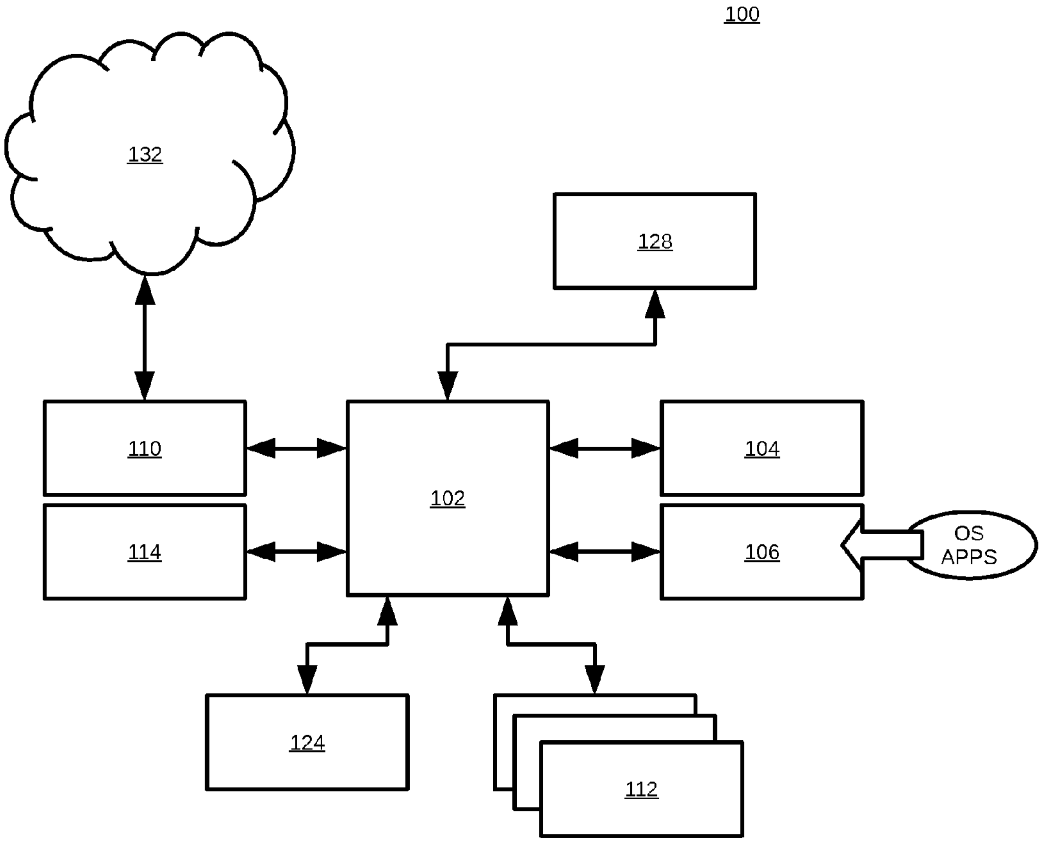
FIG. 1B is a block diagram of the ATM of FIG. 1A.

A perspective view of an ATM 100 is shown in FIG. 1A. A block diagram of the ATM 100 is shown in FIG. 1B. According to one example, the ATM 100 (also known as an ATM terminal or an ATM installation) is a free-standing kiosk or wall-mounted device and is adapted for interior or exterior use according to the environment in which the ATM is placed. In one example, the ATM 100 can be located within a bank branch in or near the place customarily reserved for manual teller activities, in order to deflect or prompt holders of electronic accounts to perform self-service transactions using the ATM 100 (also referred to as "in-line ATMs" in contrast to "vestibule ATMs").

The ATM 100 permits self-service transactions to be performed by holders of electronic accounts with financial institutions such as banks. In this specification, the term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses.

According to one example, the ATM 100 includes multiple components such as a processor 102 that interacts with other components, such as a random access memory (RAM) 104, memory 106, a display 108 (which may be a touch-sensitive display 128 capable of receiving input as well as acting as a display), a communication subsystem 110, one or more I/O devices 112, and other subsystems 114. Information such as text, characters, images, icons, and other items may be displayed on the touch-sensitive display 130 via the processor 102. According to one example, the I/O devices 112 include a card slot 116, a keyboard or PIN pad 118, one or more buttons 120, a speaker 122, a microphone 124, a currency dispenser 126 and a deposit media acceptor 128. One or more input or output devices may be included depending on the example. A power source (not shown), such as a port to an external power supply, powers the ATM 100.

Certain components or sub-systems of the ATM 100 may enable withdrawal of media such as currency (banknotes, coins, etc. of one or more countries or territories), a sheet, and other media. These components may include one or more media cassettes 136 and one or more currency dispensers 126. Use of the term "withdrawal transaction" in this specification refers to not only a transaction that reduces an amount kept in an electronic account, but also any transaction that involves a dispensed media (e.g. cashing a check, purchase or deposit with cash back, etc.). In this specification, ATM can refer to any system or apparatus configured to dispense media items.

According to one example, the I/O devices 112 include a receipt printer 132. The receipt printer 132 may print and/or dispense a receipt after a self-service transaction is completed or attempted. Alternatively, the ATM 100 may cause an electronic receipt to be forwarded to the account holder via secure message, SMS, email, or the like.

The ATM 100 includes an operating system and software programs, applications, or components that are executed by the processor 102 and are typically stored in a persistent, updatable store such as the memory 106. For example, one such application may be a terminal application that provides a user interface for the account holder to complete self-service transactions. Additional applications or programs may be loaded onto the ATM 100 through the communication subsystem 110, one of the I/O devices 112, or any other suitable subsystem 114. The processor 102 controls the overall operation of the ATM 100. Communication functions, including communications over a network 134, are performed through the communication subsystem 110.

According to an alternative example, the ATM 100 or some functions thereof can be performed by an electronic device 138, such as a desktop computer, notebook computer, tablet computer, cellular phone, smartphone, smartwatch, mobile device, and so forth. The electronic device 138 can be configured to perform transaction functions or to stage transactions that are carried out at the ATM 100. For example, a withdrawal transaction can be prepared or "staged" using an application or app loaded on the electronic device 138 using the method disclosed herein. The staged transaction can then be completed at the ATM 100 having a currency dispenser 126 that dispenses the media to complete the transaction.

As used in the present specification, the term "dispense" or "dispensing" encompasses distributing or providing of media items. The format of the media items can be physical (e.g., currency, coins, tokens, paper tickets) or digital (e.g., digital goods or coupons). The media items are capable of being distributed in a mix. The term "mix" in the present specification typically means two or more different media items of the same class (e.g. two different denominations of paper currency), or two or more media items of different classes (e.g. one denomination of paper currency and one denomination of coins).

According to some examples, the media items can represent value. Furthermore, according to other examples, the media items can have currency-like features and can be susceptible of ordering or division of value as with denominations of a currency. While some of the disclosed examples refer to paper currency being dispensed from one or more cassettes of an ATM, it will be apparent to the skilled reader that the disclosed systems and methods are suitable for dispensing a wide range of media items, including non-currency media items, extending to stamps, coupons, tickets, tokens, gift cards, loyalty points, loyalty miles, securities such as stocks or bonds, among other financial instruments, prescribed values of virtual currencies such as Bitcoin, among other virtual currencies, digital goods, general merchandise, general services, and the like. According to some examples, a mix of media items can include one or more denominations of currency (e.g. bank note denominations of some or all of $1, $5, $20, $50 and $100 and/or coin denominations of some or all of pennies, nickels, dimes and quarters, according to one non-limiting example) together with one or more of the non-currency media items listed above, in either digital or physical formats.

To carry out a self-service withdrawal transaction, an electronic account holder can identify an amount for withdrawal at the ATM 100 using the terminal application. According to past approaches, identifying an amount of $100 USD would cause two $50 banknotes or five $20 banknotes to be dispensed and typically without further user input or tailoring of the mix of dispensed banknotes.

In contrast, according to disclosed examples, the touch-sensitive display 130 of the ATM 100 can receive input to change the mix of banknotes prior to dispensing. Advantageously, the account holder can customize the mix at the time of a self-service transaction. The use of heuristics, or experience-based algorithms, is employed to minimize or reduce iterations of received input while providing a convenient, natural-language or "frustration-free" user experience.

According to one example, the last-in first-out heuristic can be used, responsive to user input received at the touch-sensitive display 130 and processed by the ATM 100. According to this example, a mix adjustment parameter 140 can be received at the ATM 100 for incrementing (or decrementing the count of one or more media items (such as a denomination of currency). The ATM 100 can maintain a memory or queue of mix adjustment parameters 140 and apply the heuristic iteratively until a conflict or exception is detected, in which case the oldest mix adjustment parameter 140 is discarded (hence last-in first-out). According to an alternative example, if discarding the (first) oldest mix adjustment parameter 140 still yields a conflict, then the heuristic can discard the next (second) oldest mix adjustment parameter 140 (and either discard the first oldest mix adjustment parameter 140 or not discard the first oldest mix adjustment parameter 140). In still further examples, the heuristic can selectively discard any of the mix adjustment parameters 140 stored in the queue. Robust error detection and conflict resolution techniques can be employed by the heuristic to determine which adjustment parameter 140 to discard. Other online heuristics can be used to resolve exceptions or otherwise vary a mix of media in addition to or in the alternative to the last-in first-out heuristic, including least frequently used, and least recently used, etc. Any page replacement algorithm or technique known to those of skill in the art can be used or adapted for use without departing from the scope of the present specification. Moreover, the mix adjustment parameter 140 can be any parameter associated with a class of media items or grouping thereof.

As noted above, the touch-sensitive display 130 of the ATM 100 can receive input to change the mix of banknotes prior to dispensing. According to one example, the input can correspond to commands to increment the count of a particular banknote, to decrement the count of a particular banknote, and to "clear", or decrement to zero, the count of a particular banknote. In this example, the mix adjustment parameter 140 can correspond to such counts, which can be different than the displayed counts of banknotes. In other examples, the increment/decrement value can correspond to the displayed counts of banknotes. For example, a default mix for a $120 withdrawal can be six $20 banknotes. Receipt of input corresponding to an increment command for the $10 banknote can display a mix of five $20 banknotes, and two $10 banknotes. In this example, despite the fact that the displayed count of $10 banknotes is two, the internal count is one, reflecting the input received. Receipt of further input corresponding to an increment command for the $50 banknote can display a mix of one $50 banknote, three $20 banknotes, and one $10 banknote. It will be observed that the no conflict is detected because the earliest input can be satisfied. Nevertheless, the skilled reader will appreciate that the mix adjustment parameter 140 can correspond to displayed counts rather than undisplayed (internal) counts, or to increments or decrements of more than one, all without departing from the scope of the present specification.

According to one example, the heuristic can be applied to a pre-defined or default mix that is adjusted within a single session. Upon the starting of a new session, the pre-defined mix is used and can be adjusted during the session. According to another example, the mix is not pre-defined and can be based on historical data or preferences stored in an account profile data record (discussed in further detail below). Upon the starting of a new session according to this example, a mix derived from an electronic account holder's profile data record is used and can be further adjusted during the session. Advantageously, following the methods and systems disclosed herein can lead to more dynamic, personalized transactions with reduced or minimized user interaction steps and/or reduced transaction processing through the use of heuristics.

Figure 2:
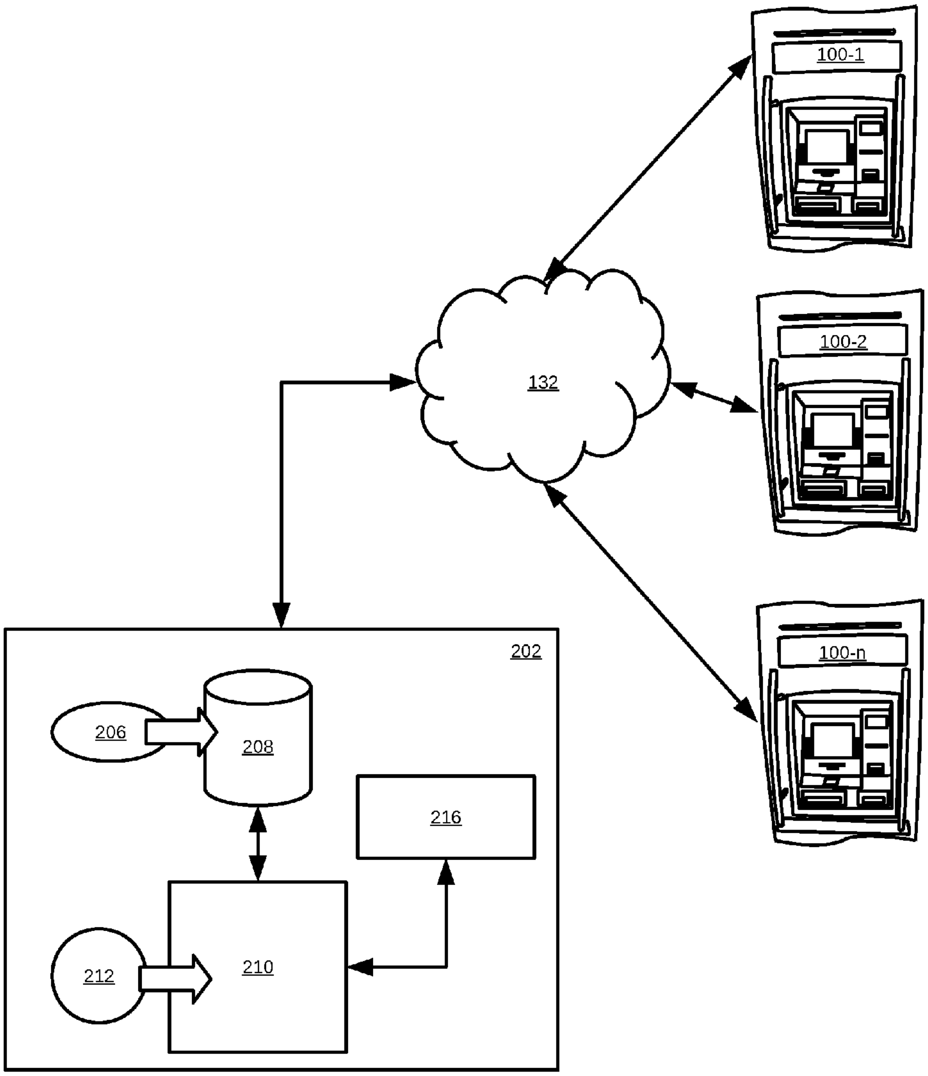
FIG. 2 is a block diagram of a networked system for media dispensing in ATMs in accordance with an example.

A block diagram of an example of a system 200 for media dispensing in ATMs is shown in FIG. 2. The system 200 includes one or more ATMs 100 (shown as 100-1, 100-2, up to 100-*n*) and a host system 202. According to one example, the host system 202 includes multiple components such as a processor 210 (not shown) that interacts with other components, such as a random access memory (RAM) 212 (not shown), memory 214 (not shown), a communication subsystem 216 (not shown), and other subsystems 218 (not shown). A host system 202 includes an operating system and software programs, applications, or components that are executed by the processor 210 and are typically stored in a persistent, updatable store such as the memory 214. Additional applications or programs may be loaded onto the host system 202 through the communication subsystem 216, or any other suitable subsystem 218. The processor 210 controls the overall operation of the host system 202. Communication functions, including communications over the network 134, are performed through the communication subsystem 216. The communication subsystem 216 receives messages from and sends messages to a communication subsystem 110 of each ATM 100 via the network 134.

In one example, the host system 202 is configured to perform several functions. For example, the host system 202 can communicate with the one or more ATMs 100 to receive a plurality of messages including account profile data records 206 and maintains a data storage 208 of the account profile data records 206. The account profile data record 206 can represent a given account's media mix preferences in the form of one or more media mix data values (discussed in further detail below).

The data storage 208, which can be memory 214, maintains a plurality of account profile data records 206. According to one example, the data storage 208 may be a database management system that processes all data requests between an ATM 100 and the host system 202. According to this example, the data requests between the data storage 208 and the host system 202 may be made over a secure network connection. In one example, the data storage 208 is a stand-alone database server (such as Microsoft™ SQL Server™) that may be co-located with the host system 202, or alternatively may be geographically dispersed. In some examples, the data storage 208 can be a stand-alone physical server, and in other examples, may be a virtual machine.

After a transaction is attempted at the ATM 100, information about the transaction and particularly a memory of the media mix may be generated, consolidated, and parsed in one or more applications or routines that are executed by one of the processors 102 or 210, for example. The information may be formatted in a media mix data value that is sent in a message to the host system 202. Upon receipt of the message including the media mix data value, the host system 202 may parse the message, and store the media mix data value in the account profile data record 206 in turn stored in the data storage 208 (or data management system that is configured to have the functionality of the data storage 208). The data storage 208 may include an operational data store (an intermediate data warehouse), and a data warehouse store. According to one example, the media mix data values may be received by the host system 202, stored in the operational data store for consolidating, and passed to the data warehouse store for archiving and reporting. Various extract, transform, and load (ETL) operations may be performed on the media mix data values to consolidate the media mix data values before being passed to the warehouse data store. Although one particular implementation of the data storage 208 has been illustrated, the data storage 208 may be implemented using one or more servers and databases to implement other examples.

The messages between the one or more ATMs 100 and the host system 202, and any back-end financial systems, may be sent or received over the network 134 using a secure network connection, such as a secure TCP/IP connection. The messages may be sent and received by the respective communications subsystems 110 and 216. In one example, some of or all the messages may be sent using SSL secure communication transmissions. For example, messages including media mix data values may be sent using SSL secure communication transmissions or other techniques such as public/private key cryptography.

The network 134 may be any type of communications network such as a wired or wireless network. The network 134 may be a private network or a public network. Messages sent over the network 134 may be encrypted or otherwise secured.

The host system 202 may be connected to external systems that route financial transactions to other systems of the financial institution or other financial institutions.

In one example, the host system 202 includes an analytics engine (not shown) that provides logic to the processor 210 to provide business intelligence derived from the data storage 208. Queries of the account profile data records 206 and/or media mix data values may be made to derive business intelligence information regarding a sample set of media mix data values. Data-mining may yield trends or metrics used to set or adjust pre-defined media mixes, adjustment parameters, or heuristics for media dispensing at specified places, times of the day or week, etc., or for performance management reasons.

For example, a financial institution that experiences a large number of empty media cassettes 136 for one denomination may query the account profile data records 206 and/or media mix data values to uncover usage patterns, trends or preferences, ensuring that an optimal level of media items is available in the media cassettes 136 of the ATMs 100.

Figure 3:
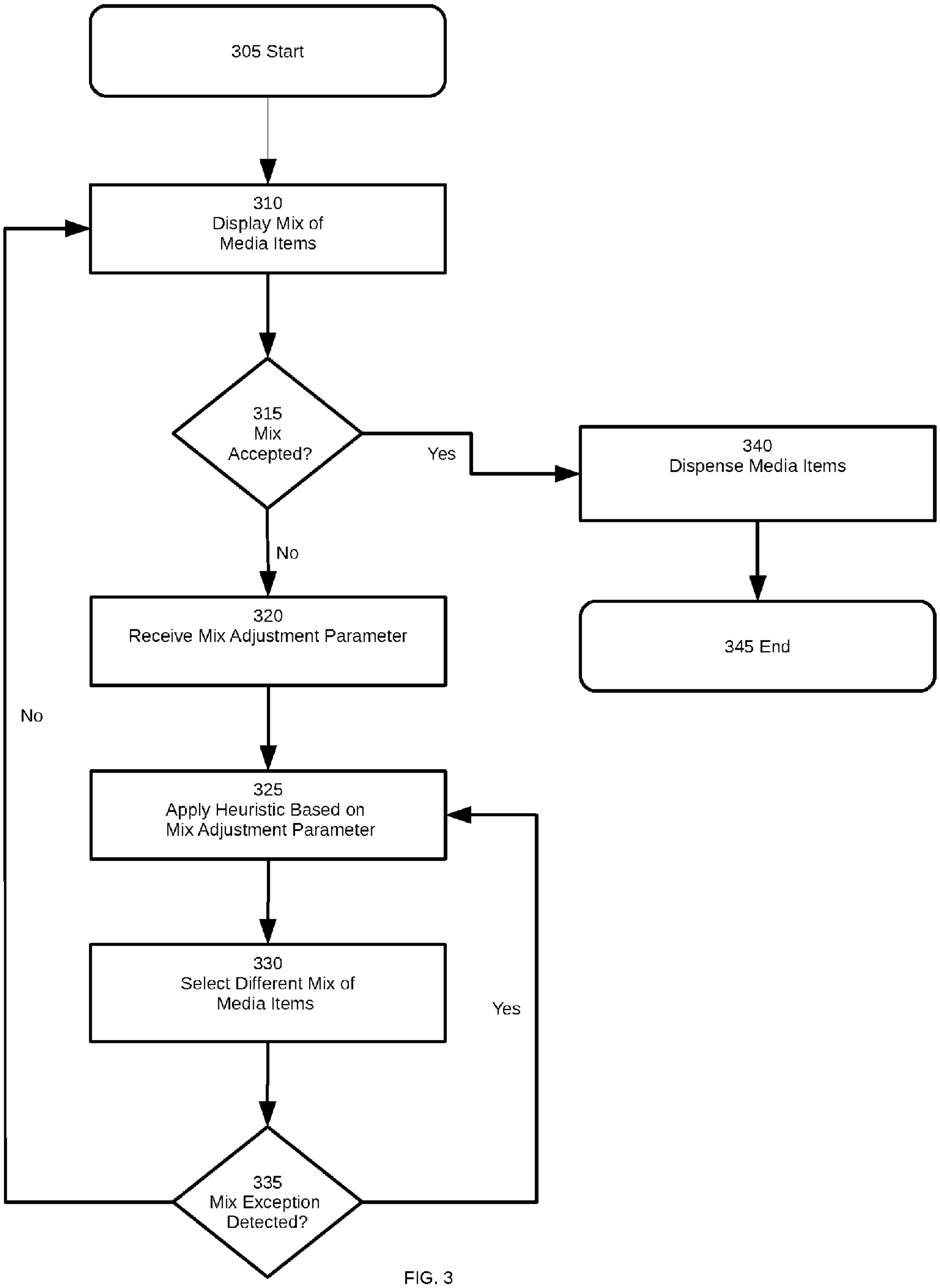
FIG. 3 is a flowchart illustrating an example of a method of media dispensing in an ATM.

A flowchart illustrating an example of a disclosed method of media dispensing in an ATM is shown in FIG. 3. This method may be carried out by software executed by, for example, the processor 102. Coding of software for carrying out such a method is within the scope of a person of ordinary skill in the art given the present description. The methods may contain additional or fewer processes than shown and/or described, and may be performed in a different order. Computer-readable code executable by at least one processor of the ATM 100 to perform the methods may be stored in a computer-readable storage medium, such as a non-transitory computer-readable medium.

Figure 4:
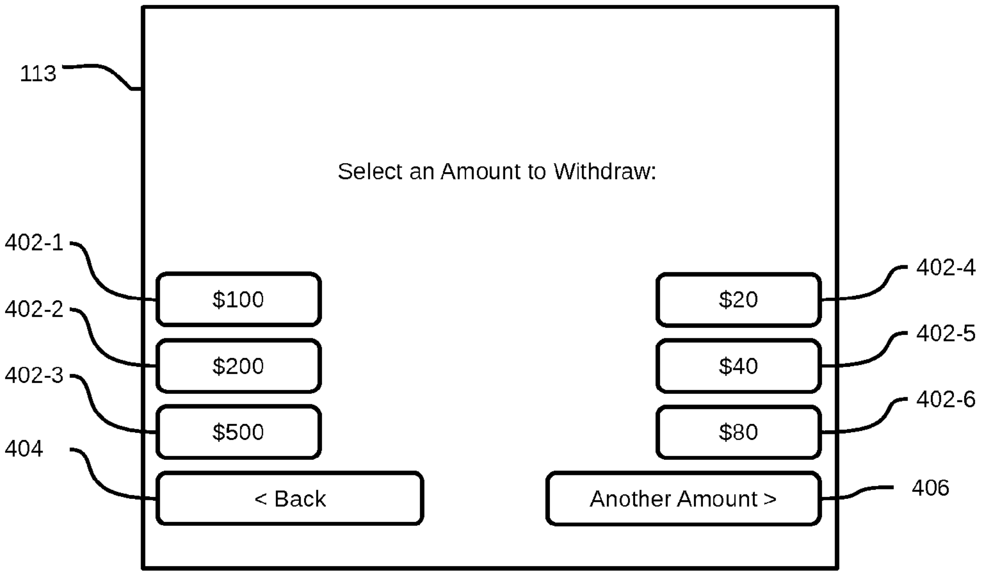
FIG. 4 through FIG. 8 are views illustrating example screenshots of a terminal application loaded on the ATM of FIG. 1A for use in accordance with the method of FIG. 3.

The method starts at 305, and at 310, a self-service withdrawal transaction at the ATM 100 is attempted and an initial mix of media items is displayed on the touch-sensitive display 130. In this example, $100 is being withdrawn and a mix of five $20s is displayed. At 315, the mix can be accepted and at, 340, the accepted mix of media items is dispensed. Alternatively, the touch-sensitive display 130 can receive user input including a touch (also referred to as a touch event) at a location of the touch-sensitive display 130 at 320. In this example, a touch is received at a location corresponding to a mix adjustment parameter 140 having a value of −1 associated with the $20 denomination. At 325, the ATM 100 applies a heuristic using a received mix adjust parameter, in this case to decrement the $20 denomination. At 330, a different mix of media items is selected for presentation on the touch-sensitive display 130 unless an exception or conflict is detected at 335. Where a conflict is detected such as, for example, a parameter that would reduce to zero the $5 denomination for a $75 withdrawal, the ATM 100 provides error handling to reconcile the conflict. One example of error handling is to apply a last-in first-out heuristic that discards the oldest incompatible mix adjustment parameter 140 (discussed in further detail below). Other examples can use another online heuristic or a different paging algorithm. In FIG. 4, this is shown as re-trying step 325. Error handling is continued until the exception is resolved and the new mix of media items is displayed at 310, ready for acceptance at 315 or re-adjustment according to the receipt of a further mix adjustment parameter 140. The terminal application loaded on the ATM 100 provides an improved interface for selection of personalized bill mixes, described in further detail with reference to FIG. 4 through FIG. 8.

Examples of screenshots of the terminal application displayed on the touch-sensitive display 130 of the ATM 100 in accordance with the present disclosure are depicted in FIG. 4 through FIG. 8 and described with continued reference to FIG. 3.

With reference to FIG. 4, screenshot 400 can be launched and displayed on the touch-sensitive display 130 by accessing a terminal application loaded on the ATM 100. Locations 402-1, 402-2, 402-3, 402-4, 402-5, and 402-6, are shown on the display representing amounts for withdrawal, together with a location 406 representing an option to select a different amount for withdrawal. It will be appreciated that more or fewer locations 402 can be displayed representing different amounts according to other examples. As well, one or more locations 404 can be displayed to enable navigation of the user interface of the terminal application.

Figure 5:
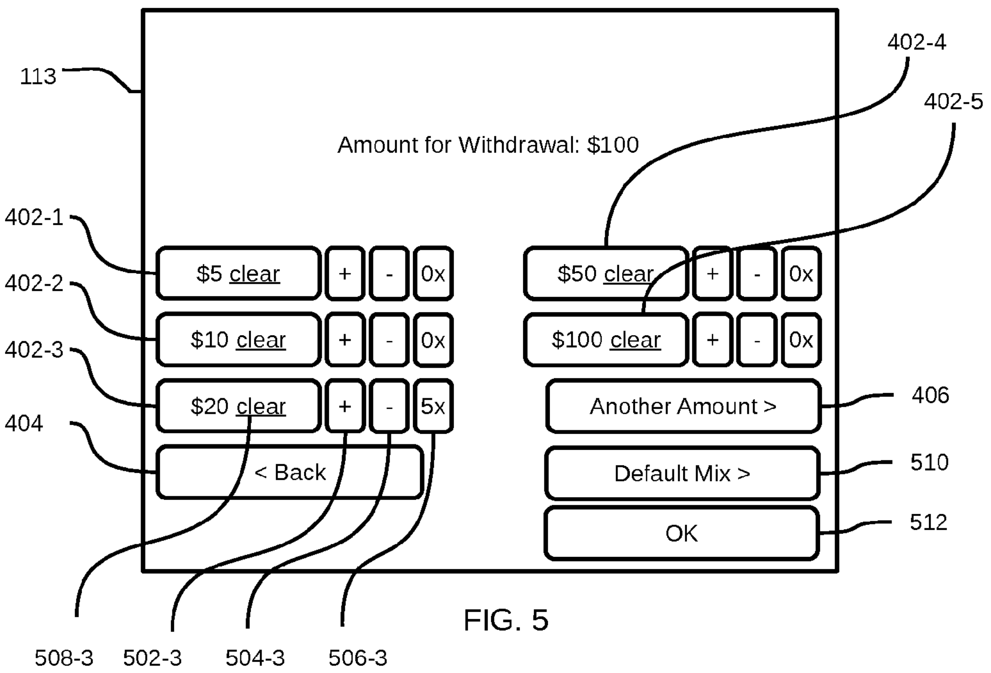

Turning to FIG. 5, screenshot 500 is launched after detecting or receiving a touch at a location corresponding to an amount for withdrawal, in this case 402-1 for a $100 withdrawal transaction. In screenshot 500, the locations 402 shown on the display can change (or change in number) to represent the denominations selected or available to make up the amount for withdrawal. Additional locations 502 (increment), 504 (decrement), 506 (count) and 508 (clear) associated with each denomination provide additional controls or information for selection of denomination mixes. Touching or otherwise selecting one of the locations 502, 504 or 508 provides the terminal application of the ATM 100 with a mix adjustment parameter 140. In this case, location 402-3 depicts a $20 denomination and location 506-3 depicts a count of five, reflecting the default mix for the particular transaction and/or account and/or session. In other examples, a sub-total for a currency denomination can be displayed (not shown in FIG. 5). Location 510 (default mix) depicts a function to restore the default mix or, according to some examples, immediately accept the default mix and cause the dispensing to occur. Detecting a touch at location accepts the displayed mix and causes the dispensing to occur.

Figure 6:
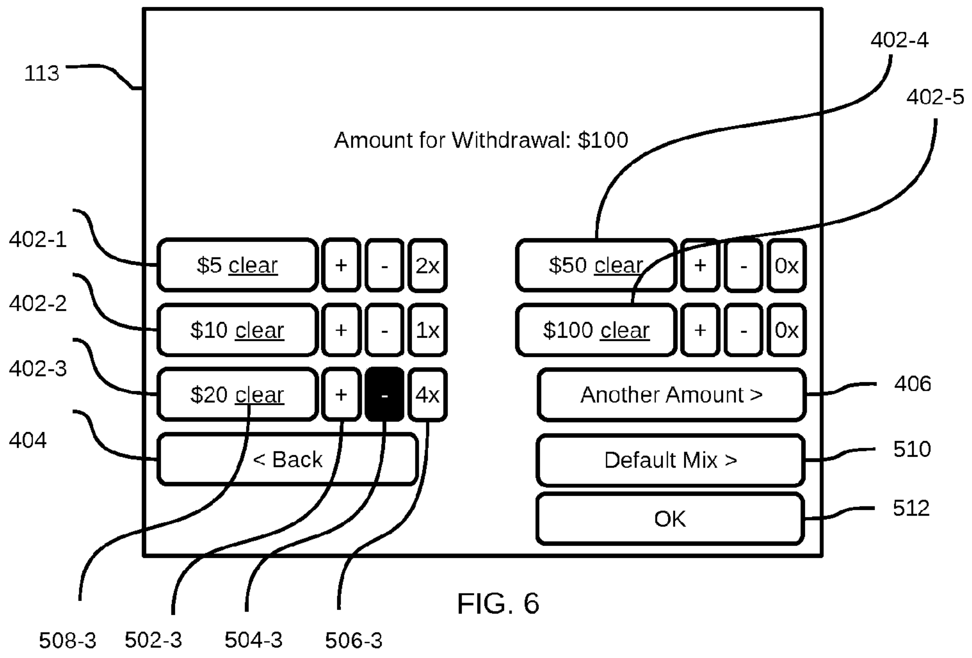

Now with reference to FIG. 6, a touch has been detected at 506-3 (mix adjustment parameter 140 of −1 associated with the $20 denomination). Through the application of a heuristic according to disclosed examples, a second mix for this transaction is selected and displayed, namely two $5 denominations, one $10 denomination, and four $20 denominations. A touch detected at location 512 accepts this second mix, enabling a customized mix of banknotes to be withdrawn from the electronic account with a reduced number of touch events.

Figure 7:
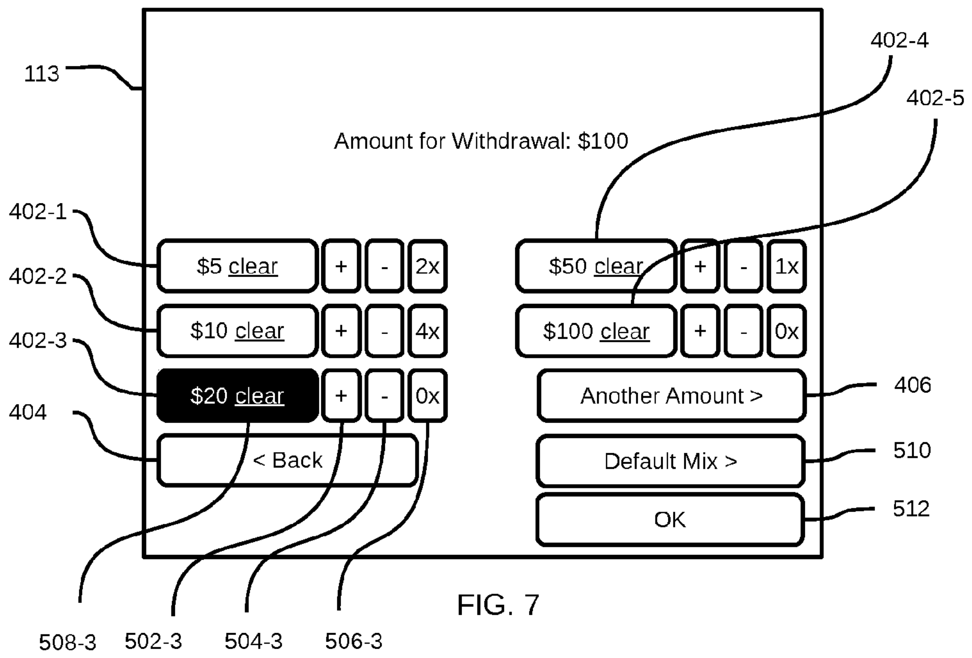

Turning to FIG. 7, a touch has been detected at 508-3 (mix adjustment parameter 140 of 0 associated with the $20 denomination). Through the application of a heuristic according to disclosed examples, a third mix for this transaction is selected and displayed, namely two $5 denominations, four $10 denominations, and one $50 denomination. Again, a touch detected at location 512 accepts this third mix.

Figure 8:
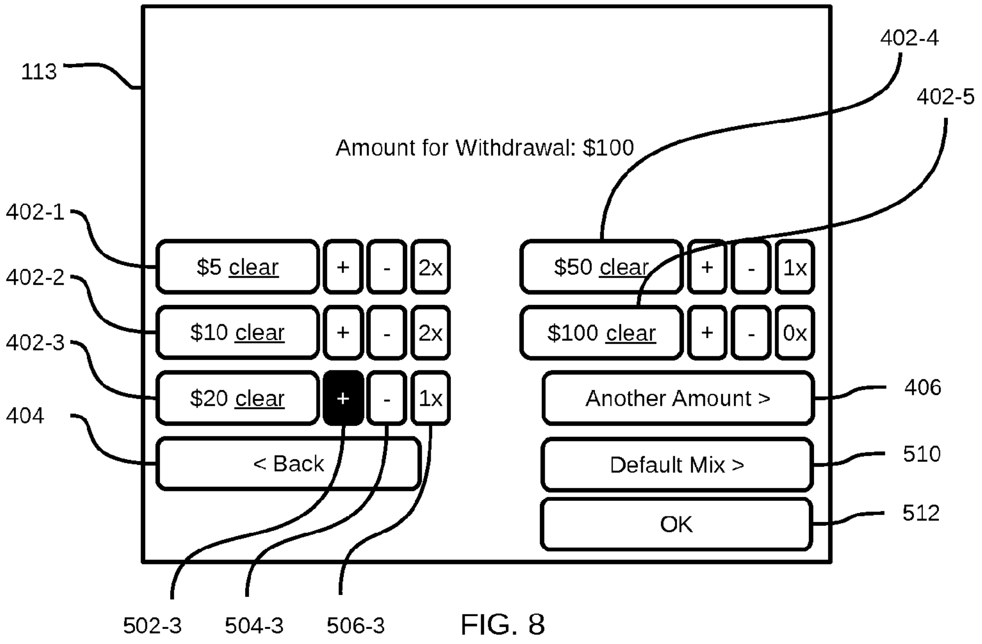

In FIG. 8, a touch has been detected at 504-3 (mix adjustment parameter 140 of +1 associated with the $20 denomination). Through the application of a heuristic according to disclosed examples, a fourth mix for this transaction is selected and displayed, namely two $5 denominations, two $10 denominations, one $20 denomination and one $50 denomination. It will be appreciated that this touch event provides a mix adjustment parameter 140 that is not compatible with the previous mix adjustment parameter 140 (to clear the $20 denomination) and, accordingly, the last-in first-out heuristic (acting as an exception or error-handling routine) causes the ATM 100 to un-apply the previous mix adjustment parameter 140 and apply the current mix adjustment parameter 140 instead. Once again, a touch detected at location 512 accepts this fourth mix.

Although the examples refer to a $100 withdrawal transaction and simple adjustments of the $20 denomination, it will be appreciated that the application loaded on the ATM 100 is adapted to handle numerous adjustments with intelligent conflict resolution and robust error handling according to the techniques disclosed herein. Multiple currencies can be dispensed in a single or multiple terminal application sessions.

In other examples, locations of the touch-sensitive display 130 that are not selectable for a withdrawal amount can be “greyed out” providing a user interface cue of mix constraints, further enabling the ease of use of the disclosed terminal application loaded on the ATM 100. Still other user interface controls can be provided to “grey out” or “lock in” particular denominations meaning that the heuristic can be adapted to fit business rules, preferences or other constraints (e.g. account balance limit, account daily or session limits, the stock of the cassettes 136, as well as account holder’s preferences such as “no $50’s”, and the like).

A method of dispensing media from an ATM is disclosed. The method includes the steps of: at an electronic device including a processor, a memory, and a touch-sensitive display, displaying a first mix of media items for dispensing by the ATM, receiving input from the touch-sensitive display including a first mix adjustment parameter, applying a heuristic based on the received first mix adjustment parameter; and, at the ATM, dispensing a second mix of media items, the second mix responsive to the application of the heuristic.

The method can include displaying the second mix of media items, receiving input from the touch-sensitive display comprising a second mix adjustment parameter, re-applying the heuristic based on the received second mix adjustment parameter, and at the ATM, dispensing a third mix of media items, the third mix responsive to the application of the heuristic and the re-applying of the heuristic.

The method can further include detecting an exception between the applying of the heuristic and the re-applying of the heuristic, un-applying the heuristic based on the received first mix adjustment parameter, and at the ATM, dispensing a fourth mix of media items, the fourth mix responsive to the application of the re-applying of the first heuristic.

According to one example, the mix adjustment parameter includes an increment/decrement value that updates the contents of the second mix of media items in correspondence to the increment/decrement value. According to a non-limiting example, the correspondence can be a ratio of 1:1.

In one example, the method can include the steps of authenticating a user, accessing a account profile data record corresponding to the authenticated user stored in a user profile database, and populating the first mix of media items from a default data field within the account profile data record.

The heuristic can be an online heuristic selected from one of: last-in first-out, least frequently used, and least recently used. The online heuristic can include a queue of mix adjustment parameters and the queue is maintained until an exception is detected. When the online heuristic includes a last-in first-out heuristic, the oldest mix adjustment parameter can be discarded upon detection of the exception. Alternatively, the online heuristic can select one of the mix adjustment parameters for discarding from the queue.

The media items can include bank notes. The bank notes can be selected from a plurality of bank note denominations.

The media items can include coins. The coins can be selected from a plurality of coin denominations.

The media items can be one or more of stamps, coupons, tickets, tokens, gift cards, loyalty points, loyalty miles, securities, financial instruments, prescribed values of virtual currencies, digital goods, general merchandise or general services.

The ATM can include a plurality of cassettes each containing a plurality of media items, and the media items can be dispensed from the plurality of cassettes. In one example, the electronic device and the ATM are integral. In another example, the electronic device is a portable electronic that pre-stages the dispensing at the ATM.

A computer-readable medium is disclosed having computer-readable code executable by at least one processor of an ATM to perform these methods.

A system for media dispensing in ATMs includes a host system including a data storage maintaining a plurality of account profile data records, a communication subsystem for communicating over a network with one or more ATMs, and a processor coupled to the data storage and the communication subsystem. The processor is configured to respond to queries of the data storage received at the communication subsystem. Each ATM includes a touch-sensitive display, an ATM communication subsystem and an ATM processor coupled to the touch-sensitive display, and the ATM communication subsystem. The ATM processor is configured to authenticate a user, access an account profile data record corresponding to the authenticated user stored in the data storage, populate a first mix of media items from a default data field within the account profile data record, display a first mix of media items for dispensing by each ATM, receive input from the ATM touch-sensitive display comprising a first mix adjustment parameter, apply a heuristic based on the received first mix adjustment parameter, and dispense a second mix of media items from the ATM, the second mix responsive to the application of the heuristic.

While a number of exemplary aspects and examples have been discussed above, those of skill in the art will recognize certain modifications, permutations, additions and sub-combinations thereof. The described embodiments are to be considered in all respects only as illustrative and not restrictive. The scope of the present disclosure is, therefore, not intended to be restricted by the foregoing but is instead defined by the claims attached hereto.

The invention claimed is:

1. A method of dispensing media from an ATM, the method comprising the steps of:

at an electronic device comprising a processor, a memory, and a touch-sensitive display, displaying a first mix of media items for dispensing by the ATM;

receiving input from the touch-sensitive display comprising a first mix adjustment parameter;

applying a heuristic based on the received first mix adjustment parameter;

displaying a second mix of media items;

receiving input from the touch-sensitive display comprising a second mix adjustment parameter;

re-applying the heuristic based on the received second mix adjustment parameter; and at the ATM, dispensing the second mix of media items, the second mix responsive to the applying of the heuristic and the re-applying of the heuristic.

2. The method of claim 1 further comprising the steps of:

detecting an exception between the applying of the heuristic and the re-applying of the heuristic;

un-applying the heuristic based on the received first mix adjustment parameter; and at the ATM, dispensing a third mix of media items, the third mix responsive to the re-applying of the heuristic.

3. The method of claim 2 wherein the mix adjustment parameter comprises an increment/decrement value that updates the contents of the second mix of media items in correspondence to the increment/decrement value.

4. The method of claim 3 wherein the correspondence is a ratio of 1:1.

5. The method of claim 1 further comprising the steps of:

authenticating a user;

accessing an account profile data record corresponding to the authenticated user stored in a user profile database; and populating the first mix of media items from a default data field within the account profile data record.

6. The method of claim 1 wherein the heuristic comprises an online heuristic selected from one of: last-in first-out, least frequently used, and least recently used.

7. The method of claim 6 wherein the online heuristic comprises a queue of mix adjustment parameters and the queue is maintained until an exception is detected.

8. The method of claim 7 wherein the online heuristic comprises a last-in first-out heuristic, and wherein when the exception is detected, an oldest mix adjustment parameter is discarded from the queue.

9. The method of claim 7 wherein the online heuristic comprises a last-in first-out heuristic, and wherein when the exception is detected, the online heuristic selects one of the mix adjustment parameters for discarding from the queue.

10. The method of claim 1 wherein the media items comprise bank notes.

11. The method of claim 10 wherein the bank notes are selected from a plurality of bank note denominations.

12. The method of claim 1 wherein the media items comprise coins selected from a plurality of coin denominations.

13. The method of claim 1 wherein the media items are selected from one of: stamps, coupons, tickets, tokens, gift cards, loyalty points, loyalty miles, securities, financial instruments, prescribed values of virtual currencies, digital goods, general merchandise and general services.

14. The method of claim 1 wherein the ATM comprises a plurality of cassettes each comprising a plurality of media items, and the media items are dispensed from the plurality of cassettes.

15. The method of claim 14 wherein the electronic device and the ATM are integral.

16. The method of claim 14 wherein the electronic device comprises a portable electronic and wherein the portable electronic device pre-stages the dispensing at the ATM.

17. A non-transitory computer-readable medium having computer-readable code executable by at least one processor of an ATM to perform the method according to claim 1.

18. A system for media dispensing in ATMs comprising:

a host system comprising a data storage maintaining a plurality of account profile data records, a communication subsystem for communicating over a network with one or more ATMs, and a processor coupled to the data storage and the communication subsystem, wherein the processor is configured to respond to queries of the data storage received at the communication subsystem; and each ATM comprises a touch-sensitive display, an ATM communication subsystem, and an ATM processor coupled to the touch-sensitive display, and the ATM communication subsystem, wherein the ATM processor is configured to:

authenticate a user;

access an account profile data record corresponding to the authenticated user stored in the data storage;

populate a first mix of media items from a default data field within the account profile data record;

display a first mix of media items for dispensing by each ATM;

receive input from the ATM touch-sensitive display comprising a first mix adjustment parameter;

apply a heuristic based on the received first mix adjustment parameter;

display a second mix of media items;

receive input from the touch-sensitive display comprising a second mix adjustment parameter;

re-apply the heuristic based on the received second mix adjustment parameter; and at the ATM, dispense the second mix of media items, the second mix responsive to the applying of the heuristic and the re-applying of the heuristic.

19. The system of claim 18 wherein the ATM comprises a plurality of cassettes each containing a plurality of media items, and the media items are dispensed from the plurality of cassettes.

* * * * *